Patented Feb. 18, 1930

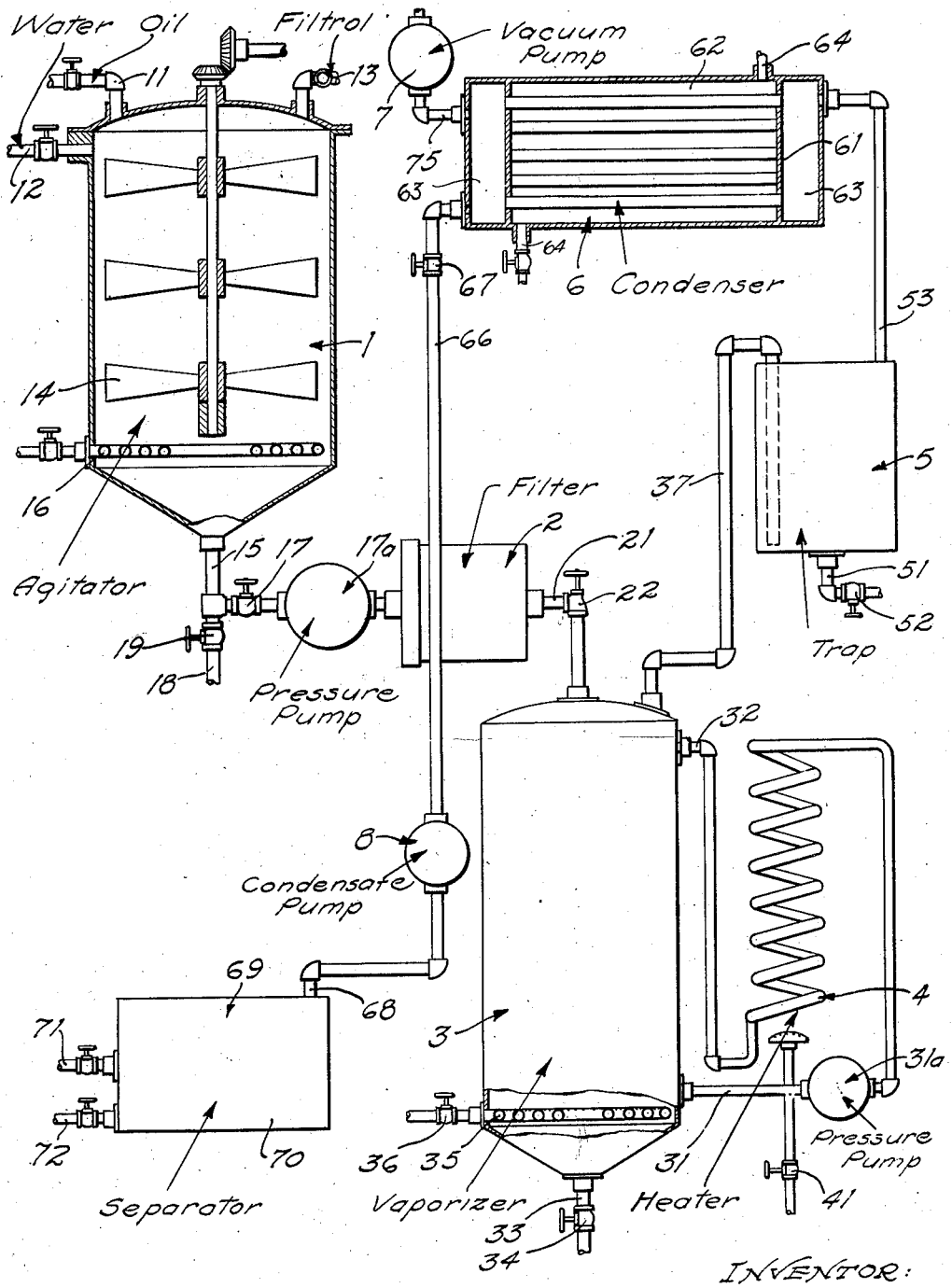

1,747,675

UNITED STATES PATENT OFFICE

WILLIAM KELLEY, OF LOS ANGELES, CALIFORNIA, ASSIGNOR, BY DIRECT AND MESNE ASSIGNMENTS, TO FILTROL COMPANY OF CALIFORNIA, A CORPORATION OF CALIFORNIA

PROCESS OF PRODUCING EDIBLE OILS FROM CRUDE COTTONSEED OIL

Application filed July 19, 1926. Serial No. 123,344.

My invention relates to the preparation of edible products from crude cottonseed oil, which in its natural state is a dark colored liquid containing impurities which render it unfit for use in foods. The process used by me is not one of general application and is of little or no value in connection with the refining of other oils, it being generally recognized that the various vegetable oils differ radically from each other and from animal fats and greases and from petroleum, so that each oil presents special problems of its own. In fact, I have found that when applied to some other oils, my process is substantially inoperative. No attempt will therefore be made to describe or claim wide ranges of equivalents, the successful operation of the process requiring a close adherence to the following description.

Many attempts have been made to refine crude cottonseed oil but the only process at present in use operates substantially as follows: The crude oil which contains considerable quantities of free fatty acids and other impurities is first treated with caustic soda to neutralize the acid, the soda and acid combining to form "foots" which are removed from the oil and used as soap stock. The oil itself is then bleached and deodorized. In practice it is necessary to use quantities of caustic soda far in excess of those theoretically necessary to neutralize the acids and considerable quantities of neutral oil are saponified or carried down into the "foots" and thus carried over with the soap stock which has a very low commercial value.

It is an object of my invention to provide means for treating a crude cottonseed oil in such a manner as to produce an edible oil of superior color and palatability without the use of caustic and without the high losses occasioned by the caustic process.

My invention may be carried on by various combinations of well known apparatus, that illustrated in the drawing, which is diagrammatic, being well adapted for the purpose.

In this drawing 1 is a primary agitator tank, 2 is a filter, 3 is a vaporizer, 4 is a heater, 5 is a trap, 6 is a condenser, 7 is a vacuum pump, 8 is a condensate pump. All of these parts may be jacketed to conserve heat.

The agitator tank 1 consists of a tight tank having an oil inlet pipe 11, a water inlet pipe 12, and a Filtrol inlet pipe 13, all these pipes being closed by suitable valves. The agitator tank is also provided with suitable agitating means such as the paddles 14 and with an outlet pipe 15, leading to the filter 2. A steam coil 16 is situated in the lower part of the agitator tank, this coil being supplied with steam from a point not shown. A valve 17 and a pressure pump $17^a$ are provided in the pipe 15. A sludge pipe 18 connects into the pipe 15, said pipe 15 having a valve 19.

The Filter 2 may be of any suitable construction capable of separating solids from liquids introduced through the pipe 15 under pressure of the pump $17^a$, the filtered liquid being delivered through a pipe 21 having a valve 22 into the vaporizer 3.

The vaporizer 3 is preferably in the form of a closed tank having an outlet circulating pipe 31 provided with a pressure pump $31^a$ for conducting oil from the bottom of the vaporizer tank into the top of the heater 4 and having a pipe 32 through which heated oil is delivered from the bottom of the heater 4 into the upper portion of the vaporizer 3. The bottom of the vaporizer 3 is provided with an outlet pipe 33 having a valve 34. A steam coil 35 is situated inside and near the bottom of the vaporizer 3, this steam coil being perforated with small holes through which steam may be distributed through the body of oil in the vaporizer, the flow of steam being controlled by a valve 36. Vapor is delivered from the vaporizer 3 to the trap 5 through a pipe 37.

The heater 4 is preferably in the form of a worm or spiral pipe through which oil circulates from the pipe 31 to the pipe 32. This pipe may be enclosed in any suitable heat directing and conserving structure not shown, and heated by a gas burner 41 or any other suitable means.

The trap 5 is preferably a closed vessel having the pipe 37 projecting into its lower part. Any liquid carried over with the vapor through the pipe 37 and collecting in the trap 5 may be withdrawn through a pipe 51 having a valve 52. Vapor is withdrawn from the top of the trap 5 and delivered to one end of the condenser 6 through a pipe 53.

The condenser 6 consists of a tight shell having intermediate heads 61 dividing its interior into a central cooling water space 62 and two manifold spaces 63. Tubes 64 are tightly secured in the heads 61 and provide an open communication between the manifold spaces 63, the tubes passing through the cooling water space 62. Cooling water is passed through the cooling water space by means of pipes 64 from any convenient source not shown. The pipe 53 delivers vapors to one of the manifold spaces 63. Condensates collecting in the other manifold space may be withdrawn by the condensate pump 8 through a pipe 66 having a valve 67. The condensates so withdrawn are discharged by the pump 8 through a pipe 68 into a separator 69. This separator may be of any desired construction, but in the form shown comprises a gravity-settling tank 70 in which non-miscible liquids may stratify and be decanted therefrom through valved pipes 71 and 72 provided in the tank 70. Fixed gases and uncondensed vapors are withdrawn from the space 63 by the vacuum pump 7 through a pipe 75.

The method of operation, which must be closely followed if satisfactory results are to be obtained is as follows:

The valve 17 being closed, the agitator tank 1 is filled with crude cottonseed oil. This oil contains many impurities such as colloidal and mucilaginous matter as well as free fatty acids and other decomposition products. The oil is then heated by the steam coil 16 to about 115° F. and five per cent to ten per cent of water is added through the pipe 12. The mixture is then agitated by the paddles for about five minutes. This washing and agitation with accurate temperature control coagulates some of the colloidal impurities carried in the oil. When the coagulation is complete the agitation is stopped and the coagulates are allowed to settle, being withdrawn with the water through the pipe 18 by opening the valve 19. As soon as the water and coagulates have been removed, the valve 19 is closed and the temperature of the oil is raised to about 170° F. and from three per cent to ten per cent of "Filtrol" or other decolorizing clay is added. "Filtrol" is a well known and widely used decolorizing clay having properties somewhat similar to fuller's earth, but being of much greater adsorbent efficiency. It is the product of the treatment of hydrosilicate clay with strong sulfuric acid, followed by a thorough washing out of the soluble sulfates so formed. It contains principally silica in porous form, some combined aluminum, acid-soluble aluminum and acid-soluble magnesium.

The temperature of the oil is now raised to between 212° F. and 220° F. by superheated steam in the coil 16. During this heating the "Filtrol" is thoroughly mixed with the oil by means of the paddles 14. After agitation at this raised temperature for a short period of time, the entire charge is forced by the pump 17ª through the filter 2 and into the vaporizer 3, through the pipes 15 and 21, the valves 17 and 22 being opened for the purpose.

In the filter 2 the "Filtrol" and other solids are removed from the oil. It should be noted, however, that the oil flowing from the filter 2 into the vaporizer 3 still contains all the free fatty acids contained in the original oil but it has been freed of its colloids due to their coagulation and from its suspended solid and other impurities by its treatment with "Filtrol" and subsequent filtration.

The valve 34 being already closed, the valves 22 and 52 are closed and a vacuum is established by the vacuum pump 7 pulling gas and vapor through the condenser 6 and trap 5. In practice the pump 7 or other well known means is employed to establish a very high vacuum in the top of the vaporizer 3, an absolute pressure of not over 60 millimeters of mercury being desirable and lower absolute pressures producing superior results.

The pump 31ª of the heater 4 is then put into action circulating oil from the vaporizer 3, through the pipe 31 and the heater 4, and back into the vaporizer through the pipe 32. The temperature of the oil in the vaporizer is thereby gradually raised to about 450° F. This raise in temperature should be produced evenly and gradually over a period of from two to five hours.

During this time the free fatty acids are vaporized and withdrawn through the pipe 37. The free fatty acids vaporize freely if steam, preferably heated to a temperature above that of the oil, is introduced through the perforated pipe 35. A relatively small weight of steam is needed since it expands greatly at the high vacuum used. The steam acts partly as an agitating agent but also serves to lower the partial vapor pressure on the free fatty acids so that they distil over at temperatures far below their atmospheric boiling point.

Any free drops of liquid carried over in the stream of vapor in the pipe 37 is caught in the trap 5 from which it may be removed through the pipe 51 and valve 52.

The mixture of steam and vapor from the trap 5 is delivered through the pipe 53 into the condenser 6 in which almost all of the steam and vapor is condensed, being pumped out of the condenser by the condensate pump 8. The condensates so withdrawn consist almost wholly of free fatty acids which are themselves free from impurities and of high quality and which are readily salable at a high price when these have been isolated by passage through the separator 69.

The vacuum pump 7 withdraws fixed gases and uncondensed vapors and thus maintains the desired vacuum.

The oil in the vaporizer 3, after having been blown with steam under vacuum as just described, may be withdrawn through the pipe 33 by opening the valve 34 and is absolutely free from any trace of free fatty acid and has a sweet and neutral flavor which renders it extremely valuable as a food product.

I have found that the above sequence of operations must be closely followed if good results are to be obtained. I find, for example, that it is necessary to coagulate the colloids before treating with "Filtrol" and absolutely necessary to remove all solid or colloidal impurities before attempting to remove the fatty acids by distillation, if a valuable commercial product is to be obtained. I have found further that unless this distillation is conducted under the vacuum and in the manner specified the color, odor or taste of the finished oil are much impaired.

I claim as my invention:

1. A process of producing an edible oil from a crude cottonseed oil which comprises: agitating the oil with from 5% to 10% of water at a temperature of about 115° F. to coagulate the colloids therein; removing the colloids and water; agitating the oil with an acid-activated adsorbent clay at a temperature of between 212° F. and 220° F.; filtering said oil to remove the adsorbent agent and other insoluble impurities therefrom; and heating the filtered oil to a temperature of about 450° F. under an absolute pressure of 60 millimeters of mercury or below, in the presence of steam, which further lowers the partial vapor pressure of the oil, for the purpose of distilling off the free fatty acids.

2. A process of producing an edible oil from a crude cottonseed oil which comprises: agitating the oil with from 5% to 10% of water at a temperature of about 115° F. to coagulate the colloids therein; removing the colloids and water; agitating the oil with an acid activated adsorbent clay at a temperature of between 212° F. and 220° F.; filtering said oil to remove the adsorbent agent and other insoluble impurities therefrom; and heating the filtered oil to a temperature of about 450° F. under an absolute pressure of 60 millimeters of mercury or below and introducing a current of superheated steam, for the purpose of distilling off the free fatty acids.

3. A process of producing an edible oil from a crude cottonseed oil which comprises: agitating the oil with from 5% to 10% of water at a temperature of about 115° F. to coagulate the colloids therein; removing the colloids and water; agitating the oil with an acid-activated adsorbent clay at a temperature of between 212° F. and 220° F.; filtering said oil to remove the adsorbent agent and other insoluble impurities therefrom; and heating the filtered oil to a temperature of about 450° F. under a low absolute pressure, in the presence of steam, which further lowers the partial vapor pressure of the oil, for the purpose of distilling off the free fatty acids.

4. A process of producing an edible oil from a crude cottonseed oil which comprises: agitating the oil with from 5% to 10% of water at a temperature of about 115° F. to coagulate the colloids therein; removing the colloids and water; raising the temperature of the oil to about 170° F.; adding an acid-activated adsorbent clay at this temperature; agitating the oil and said adsorbent agent concurrently with raising the temperature to between 212° F. and 220° F.; filtering said oil to remove the adsorbent agent and other insoluble impurities therefrom; and heating the filtered oil to a temperature of about 450° F. under an absolute pressure of 60 millimeters of mercury or below, in the presence of steam, which further lowers the partial vapor pressure of the oil, for the purpose of distilling off the free fatty acids.

5. A process of producing an edible oil from a crude cottonseed oil which comprises: agitating the oil with from 5% to 10% of water at a temperature of about 115° F. to coagulate the colloids therein; removing the colloids and water; raising the temperature of the oil to about 170° F.; adding an acid-activated adsorbent clay at this temperature; agitating the oil and said adsorbent agent concurrently with raising the temperature to between 212° F. and 220° F.; filtering said oil to remove the adsorbent agent and other insoluble impurities therefrom; and heating the filtered oil to a temperature of about 450° F. under a low absolute pressure, in the presence of steam, which further lowers the partial vapor pressure of the oil, for the purpose of distilling off the free fatty acids.

In testimony whereof, I have hereunto set my hand at Los Angeles, California, this 12th day of July, 1926.

WILLIAM KELLEY.